United States Patent

Martins et al.

[11] Patent Number: 5,860,677
[45] Date of Patent: Jan. 19, 1999

[54] RAPID CONNECTION DEVICE FOR CONNECTING A TUBE MEMBER WITH A PIPE CONNECTOR, ESPECIALLY FOR A HEAT EXCHANGER; AND A HEAT EXCHANGER EQUIPPED WITH SUCH A DEVICE

[75] Inventors: Carlos Martins, Montfort L'Amaury; Martin Wurmser, Nancy, both of France

[73] Assignee: Valeo Climatisation, La Verriere, France

[21] Appl. No.: 670,366

[22] Filed: Jun. 25, 1996

[30] Foreign Application Priority Data

Jun. 28, 1995 [FR] France .................................. 9507784

[51] Int. Cl.⁶ .................................................. F16L 35/10
[52] U.S. Cl. .......................... 285/26; 285/305; 285/914; 285/321
[58] Field of Search .............................. 285/26, 305, 319, 285/321, 331, 914

[56] References Cited

U.S. PATENT DOCUMENTS

| 2,521,127 | 9/1950 | Price . | |
|---|---|---|---|
| 4,884,829 | 12/1989 | Funk et al. | 285/24 |
| 5,201,552 | 4/1993 | Hohmann et al. . | |
| 5,324,081 | 6/1994 | Umezawa | 285/319 |
| 5,332,268 | 7/1994 | Godeau et al. | 285/305 |
| 5,350,203 | 9/1994 | McNaughton et al. | 285/305 |
| 5,464,256 | 11/1995 | Godeau | 285/305 |
| 5,489,125 | 2/1996 | Hohmann | 285/319 |
| 5,538,297 | 7/1996 | McNaughton et al. | 285/305 |
| 5,551,732 | 9/1996 | Bartholomew | 285/305 |

FOREIGN PATENT DOCUMENTS

| 593 937 | 4/1991 | European Pat. Off. . |
|---|---|---|
| 2 713 305 | 6/1995 | France . |
| 40 37 308 | 4/1992 | Germany . |

Primary Examiner—Eric K. Nicholson
Attorney, Agent, or Firm—Morgan & Finnegan, LLP

[57] ABSTRACT

In a rapid connecting device for coupling a tube member with a connector such as a terminal connector on the end of a pipe, the tube member is of the type having an annular groove. The connecting device comprises a collar piece which is adapted to be mated with the tube member, around the latter, the collar piece having a locking means for engaging in the annular groove of the tube member so as to immobilise the collar piece with respect to the latter. The connector has a socket arranged to receive the end portion of the tube member and the collar piece, with a seal being interposed between the collar piece and the tube member. The collar piece has a further locking means for immobilising the connector with respect to the collar piece. The invention is especially applicable to the coupling of heat transfer fluid inlet and outlet tube connections of a heat exchanger, with external pipes.

4 Claims, 3 Drawing Sheets

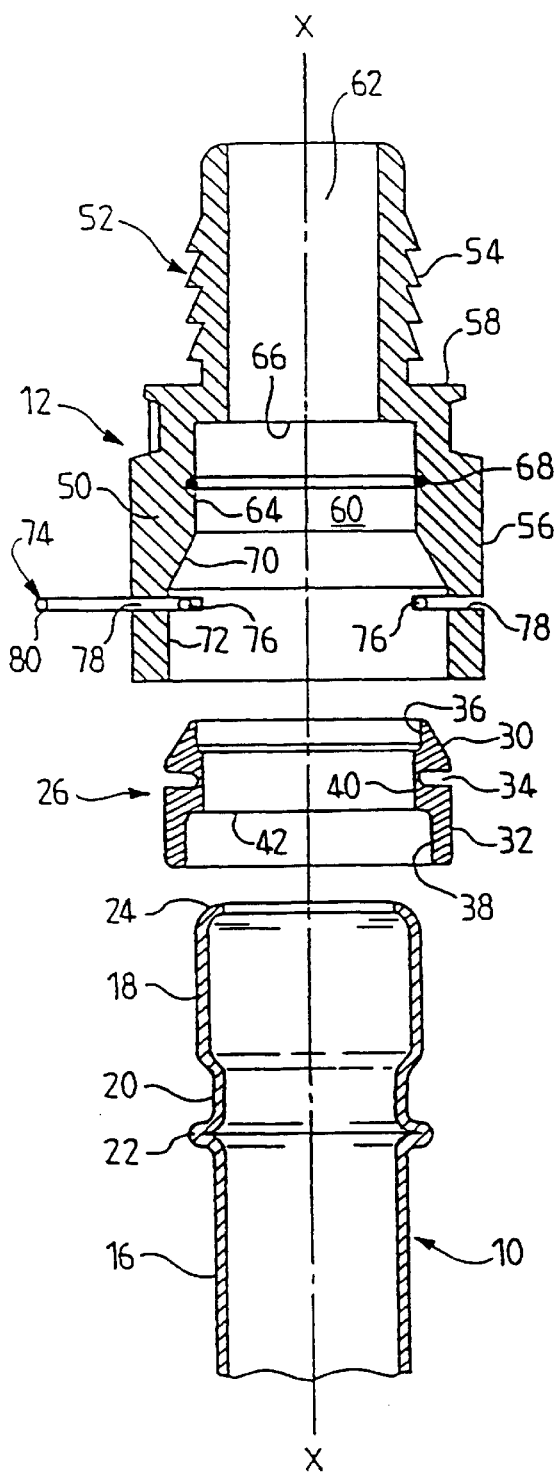
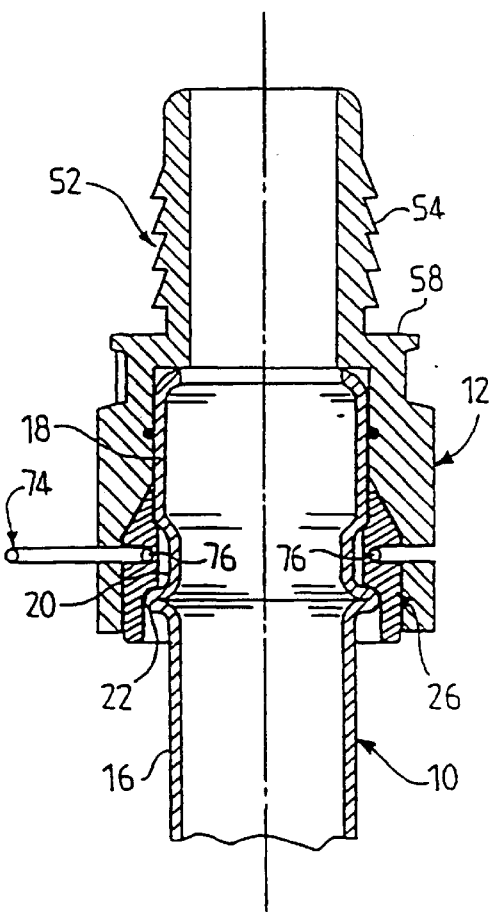
FIG. 3
FIG. 4

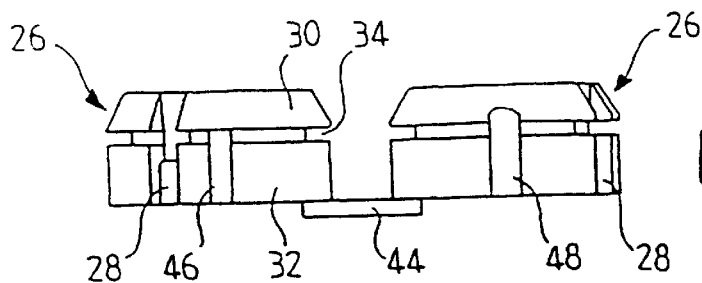
FIG. 5
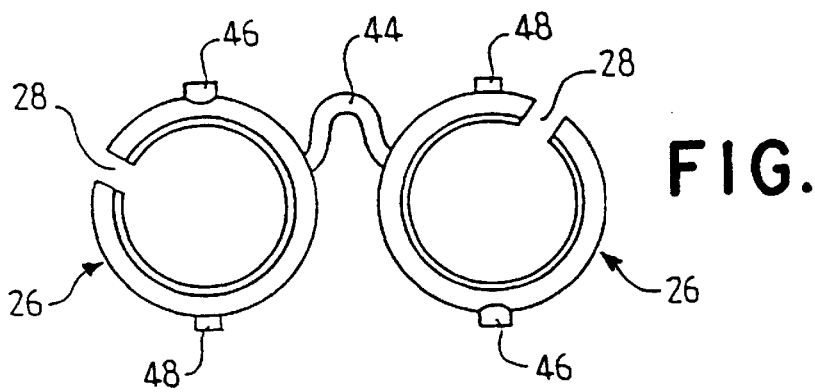
FIG. 6
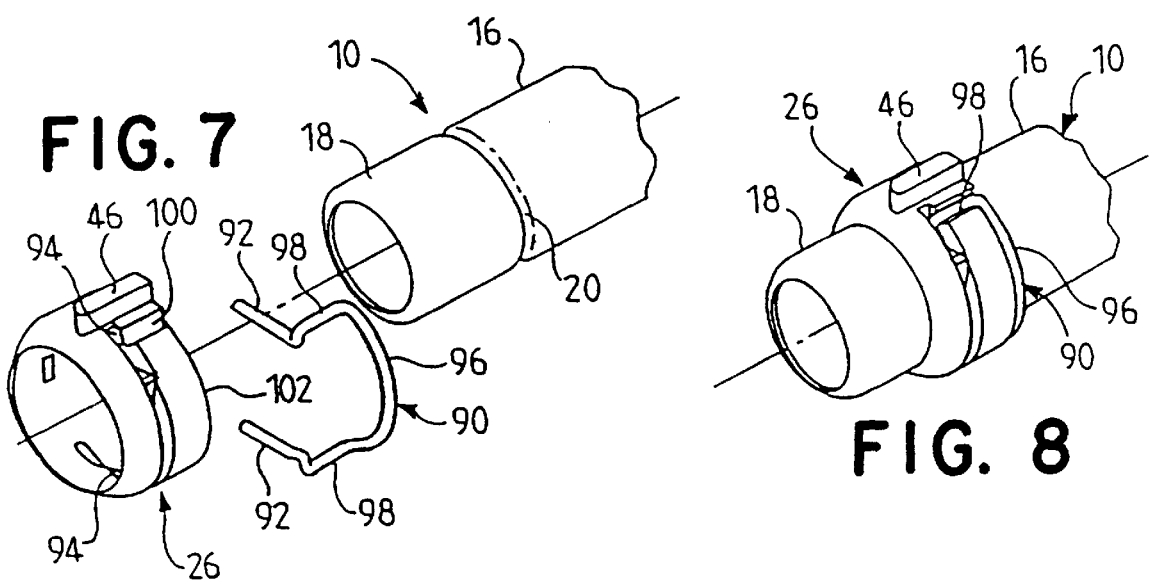
FIG. 7
FIG. 8
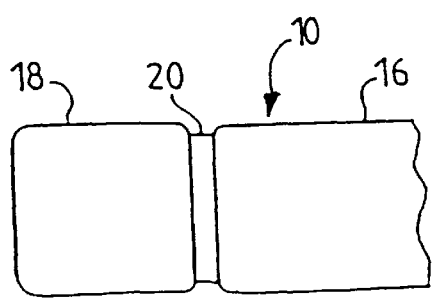
FIG. 9

RAPID CONNECTION DEVICE FOR CONNECTING A TUBE MEMBER WITH A PIPE CONNECTOR, ESPECIALLY FOR A HEAT EXCHANGER; AND A HEAT EXCHANGER EQUIPPED WITH SUCH A DEVICE

FIELD OF THE INVENTION

This invention relates to a rapid connecting device for connecting or coupling together a tube member and a connector, i.e. a terminal connector on the end of a conduit element such as a pipe or the like, in particular for a heat exchanger. The invention equally relates to a heat exchanger having such a connecting device. More particularly, the invention is concerned with a device for connecting a tube member having an annular groove with a connector which may be formed at the end of a conduit element or duct, such as a flexible pipe, or which may be a separate component fitted to the said conduit element, in mating engagement with the latter.

BACKGROUND OF THE INVENTION

Such a connecting device may in particular form part of a cooling circuit for the engine, or for heating the cabin, of a motor vehicle. Equally, such a device is generally twinned with another similar device, so as to enable the tube members of a heat exchanger which serve as the inlet and outlet branches for a heat transfer fluid, to be coupled with the two corresponding pipe connectors that are usually connected to flexible pipes for transporting the heat transfer fluid between the heat exchanger and other parts of the fluid circuit.

It is known, especially from French patent application No. 93 14261, to provide a twinned connecting device of this type. However, this known device is suitable only for use in connection with tube members of a particular kind having an external annular rib.

Now there does also exist a need for rapid connection of at least one connector with at least one tube member having an annular groove, and the invention aims to provide an answer to this need.

DISCUSSION OF THE INVENTION

According to the invention in a first aspect, a rapid connecting device, for connecting a tube member having an annular groove with a terminal connector of a conduit element, such as a pipe connector, is characterised in that it includes a collar piece which is adapted to be introduced axially into fitting engagement around the tube member, and which is provided with a first locking means adapted to engage in the annular groove of the tube member so as to immobilise the collar piece with respect to the tube member, and in that the said connector includes a socket which is adapted to receive an end portion of the tube member, together with the collar piece fitted on the latter, with sealing means being interposed between the connector and the tube member, the connector being provided with a second locking means for immobilising the connector with respect to the collar piece.

In this way, the connection of the tube member with the connector is effected through the collar piece which becomes immobilised with respect to the tube member on the one hand and the connector on the other hand, with sealing means being interposed between them.

In one embodiment of the invention, the collar piece comprises a deformable annular body which is interrupted by a slit, and the first locking means comprises an annular rib, or radially inwardly projecting element, which is formed internally on the collar piece body and which is interrupted by the said slit, this rib being adapted to engage in the annular groove of the tube member by deformation of the collar piece body.

In another embodiment of the invention, the collar piece comprises a continuous annular body, i.e. a body in the form of an endless ring, and the first locking means comprises a clip which is adapted to pass through the collar piece body from outside, in order to engage in the annular groove of the tube member.

Preferably, this clip has two branches which are substantially parallel to each other, and which are adapted to pass through two passages in the collar piece body in order to engage in two diametrically opposed regions of the groove in the tube member, with these two branches being joined together through a yoke portion which is so configured as not to project beyond the outer periphery of the collar piece.

The collar piece may have at least one indexing element, formed at the periphery of the collar piece and adapted to cooperate with a corresponding recess or housing in the connector, so as to enable the collar piece and the connector to be immobilised with respect to each other in a predetermined position or orientation. The collar piece then preferably has two diametrically opposed indexing elements having different configurations, so that they serve as locating elements.

The collar piece preferably has a body which is bounded on the outside by a frusto-conical anterior wall and a cylindrical posterior wall, such that, after the collar piece has been immobilised around the tube member, the end portion of the tube member projects beyond the collar piece.

Equally, the socket in the connector is preferably defined by a cylindrical first internal wall for receiving the end portion of the tube member, a frusto-conical internal wall for receiving the frusto-conical wall of the connector, and a second cylindrical internal wall for receiving the cylindrical wall of the collar piece.

The connector preferably has an internal groove, which receives an O-ring seal for cooperation with the end portion of the tube member.

The second locking means is preferably made in the form of a deformable ring which is adapted to surround the connector at least partly, this ring comprising two opposed portions which are biassed elastically towards each other, these two opposed portions being adapted to pass through two opposed slots formed in the connector so as to engage in an annular groove formed at the periphery of the collar piece. This deformable ring is preferably made from metal wire, and preferably has a finger element to assist its fitting or removal.

The connector may include a stepped portion projecting from the body portion of the connector, for receiving an end of an external flexible pipe thereon.

Preferably, the tube member is of metal, and may for example be made of aluminium, while the collar piece and the connector are preferably made of a suitable plastics material.

In a preferred embodiment of the invention, the connecting device comprises two of the said collar pieces which are adapted to give simultaneous coupling of two tube members with two respective connectors, these collar pieces being joined together by means of a flexible strap which enables the two collar pieces to be displaced with respect to each other.

The two tube members are preferably the tubular inlet and outlet connections for a heat transfer fluid, being part of a heat exchanger.

According to the invention in a second aspect, a heat exchanger, having two tubular branches serving as inlet and outlet for a fluid, includes a connecting device according to the invention in its first aspect.

The invention will be more clearly understood on a reading of the following description of preferred embodiments of the invention, which is given by way of example only and with reference to the accompanying drawings.

BRIEF DESCRIPTION OF THE DRAWINGS

FIG. 3 is a view in axial cross section of a terminal pipe connector, a collar piece and a tube member, before these components are coupled together.

FIG. 4 is a view similar to that in FIG. 3 after the various components shown in FIG. 3 have been coupled together.

FIG. 5 is a side view of two twinned collar pieces.

FIG. 6 is an end view corresponding to FIG. 5.

FIG. 7 is a perspective view of one collar piece in a second embodiment of the invention, before being fitted on a tube member.

FIG. 8 is a view similar to that in FIG. 7 after the collar piece has been fitted on the tube member.

FIG. 9 is a partial side view of the tube member seen in FIGS. 7 and 8.

DESCRIPTION OF PREFERRED EMBODIMENTS OF THE INVENTION

Figure 1:
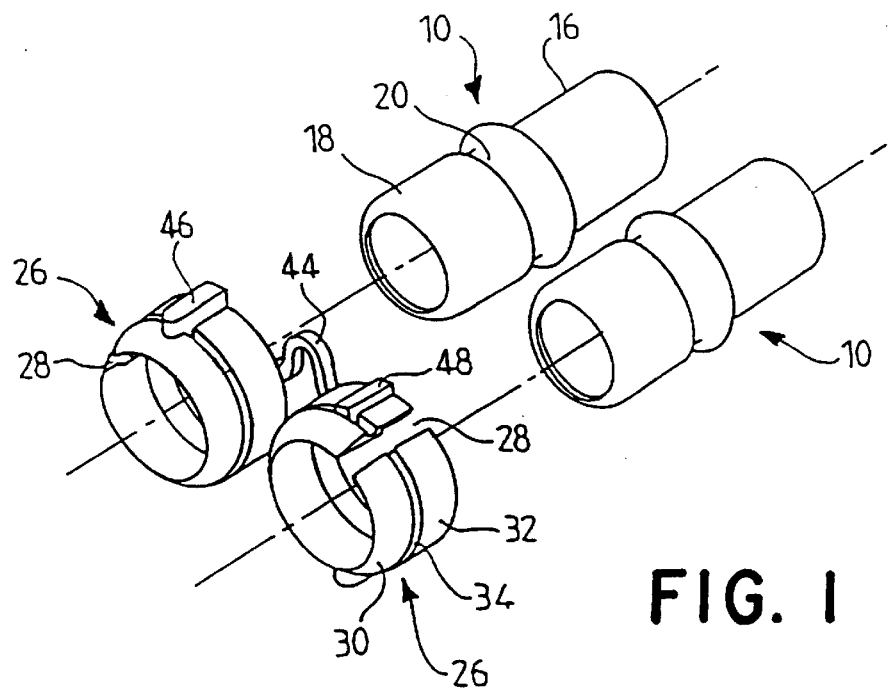
FIG. 1 is a perspective view of two twinned collar pieces of a connecting device in a first embodiment of the invention, before the collar pieces are fitted around two tube members.
Figure 2:
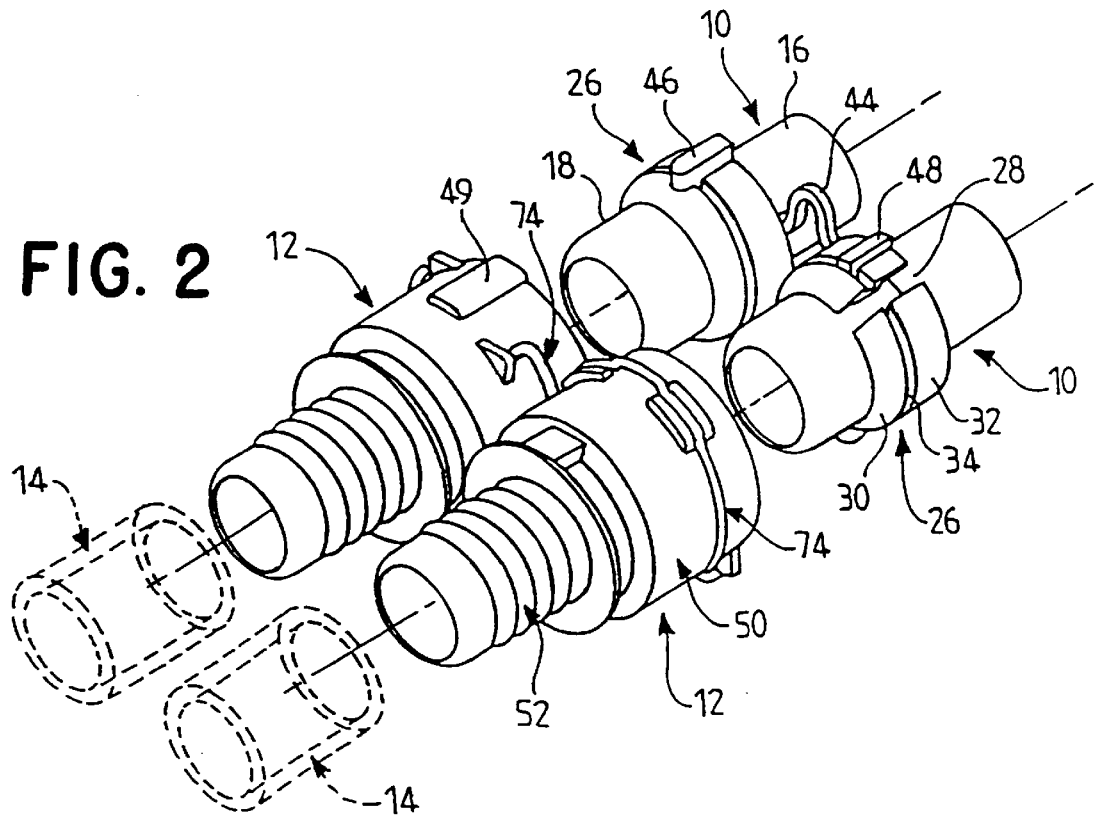
FIG. 2 shows the two tube members equipped with the two collar pieces, before being joined to two corresponding terminal pipe connectors.

The device in FIGS. 1 and 2 is designed for joining two tube members 10, having substantially parallel axes, to two respective connectors 12 shown in FIG. 2. The tube members 10, which are made for example of a metal such as aluminium, constitute the inlet and outlet branches of a heat exchanger, the remainder of which is not shown. This heat exchanger is part of a flow circuit for a heat transfer fluid, for example the coolant circuit for the engine, or for heating the cabin, of a motor vehicle. The connectors 12 are adapted to be fitted respectively in the ends of two flexible pipes 14 (which are indicated diagrammatically in broken lines in FIG. 2), so as to connect the heat exchanger to other elements of the heat transfer fluid flow circuit.

As can best be seen in FIG. 3, each tube member 10 defines a body of revolution about an axis X—X. The tube member 10 comprises a body portion 16, an end portion 18 which includes the free end of the tube member, and an annular groove 20 which is formed between the body portion 10 and the free end 18. Between the groove 20 and the body portion 16, a bead 22 is also formed. The end portion 18 terminates in an annular shoulder 24.

The connecting device also includes a pair of twinned, or interconnected, collar pieces 26 which are arranged to be fitted around the respective tube members 10 by being introduced axially on to the latter. Each collar piece 26 comprises an annular body of deformable material, for example a suitable plastics material, which is interrupted by a slit 28 (see FIGS. 1, 2, 5 and 6). The slit 28 extends in a direction generally parallel to the axis. The body of the collar piece 26 is bounded on the outside by a frusto-conical anterior wall 30 and a cylindrical posterior wall 32, in which an annular groove 34 is formed as can be seen in FIGS. 1, 2 and 3.

On the inside, the body of the collar piece is bounded by a cylindrical anterior wall 36, a cylindrical posterior wall 38 and a cylindrical intermediate wall 40. The intermediate wall 40 constitutes a rib or inwardly directed element, since its diameter is smaller than that of the walls 36 and 38, as is best seen in FIG. 3. The diameter of the posterior inner wall 38 is substantially equal to the diameter of the bead 22, so that the latter is able to engage against a shoulder 42 which is formed between the cylindrical walls 38 and 40, again as is best seen in FIG. 3. It will be understood that the collar piece 26 can be expanded radially, and then fitted around the tube member until the shoulder 42 comes into engagement against the bead 22. The collar piece then contracts in the radial direction due to its own elasticity, so that its cylindrical intermediate inner wall 40 penetrates into the groove 20 in the associated tube member, in the manner shown in FIG. 4.

The two collar pieces 26 of a pair are, in this example, connected together by a flexible U-shaped strap 44 which enables the two collar pieces to be displaced with respect to each other in a direction at right angles to their respective axes.

In addition, each of the collar pieces 26 has two index elements 46 and 48 diametrically opposed to each other. These index elements have different configurations so as to serve also as locating elements. The index elements 46 and 48 are in the form of projecting nibs which are adapted to engage in corresponding recesses or apertures in the connectors 12, for example in an aperture 49 shown in FIG. 2.

Each connector 12 is preferably made of suitable plastics material, and, as can best be seen in FIG. 3, it comprises a body portion 50 which is extended by a tubular portion 52 having a stepped profile 54 for insertion in a pipe 14. The body portion 50 is bounded on the outside by a cylindrical wall 56, which is joined to the tubular portion 52 through a shoulder 58.

The connector 50 has an internal socket 60 which is designed to receive the end portion 18 of the corresponding tube member 10, together with the collar piece 26 which has been fitted on to the tube member 10 beforehand. The socket 60 communicates with an axial passage 62 formed through the tubular portion 52 of the connector, as can be seen in FIG. 3. The socket 60 is bounded by a cylindrical wall 64, the diameter of which is substantially equal to that of the end portion 18 of the tube member 10. The cylindrical wall 64 is joined to the passage 62 through a shoulder 66. The tubular wall 64 is formed with an annular groove for receiving an O-ring seal 68. The socket 60 is further bounded by a frusto-conical wall 70, which is joined, firstly to the wall 64 and secondly to a cylindrical wall 72 which is open on the outside. The walls 70 and 72 have profiles which are matched to the outer walls 30 and 32 of the collar piece 26, respectively.

Each connector 12 is provided with a locking member 74 for immobilising the connector with respect to the corresponding collar piece 26 after these two components have been mated together. In this example the locking member 74 is in the form of a deformable metal wire ring, arranged to embrace the connector 12 at least partly. The locking ring 74 comprises two opposed portions 76 which are biassed elastically towards each other as shown in FIG. 3. These two portions 76 are arranged to pass through two opposed slots 78 which are formed in the body portion 50 of the connector 12, so as to set up a passage of communication between the outer wall 56 and the inner wall 72. The locking ring 74 also has a finger element 80 to facilitate its actuation. The two opposed portions 76 are arranged to engage in the external groove 34 of the collar piece 26, so as to secure the latter against movement with respect to the associated connector 12.

The device shown in FIGS. 1 to 6 works in the following way. The two collar pieces 26 are presented in facing relationship to the respective end portions 18 of the tube members 10, along the axis of the latter, as shown in FIG. 1. The collar pieces are then passed over the end portions 18, which causes them to expand radially and then to contract, so as to reach the position shown in FIG. 2. In this position, the two collar pieces are immobilised axially on the tube members 10, and are also prevented from rotating due to the strap 44. The two connectors 12 are then presented in axial facing relationship with the tube members 10, again on the same axis as the latter, the tube members 10 having been fitted beforehand with the collar pieces 26 as shown in FIG. 2.

The connectors 12 are now offered up axially so as to fit around the end portions 18 of the tube members 10 and around the collar pieces 26, until they reach the position shown in FIG. 4. At the end of the movement of the connectors 12 into engagement in this way on the tube members 10, the locking member 74 automatically opens, after which its two portions 76 close up towards each other so as to enter the groove 34 in the collar piece 26. The collar piece is thereby locked, firstly with the tube member 10 and secondly with the connector 12. In addition, the O-ring seal 68 provides sealing between the end portion 18 of the tube member and the connector. In this way a rapid connection can be carried out on motor vehicle production lines in a manner which is particularly simple and quick.

Reference is now made to the embodiment shown in FIGS. 7 to 9. In this embodiment, the tube member 10 again has an annular groove 20. However, by contrast with the first embodiment described above, there is here no bead between the groove 20 and the body portion 12 of the tube member 10.

In this second embodiment, the collar piece 20 has an annular body which is continuous and therefore has no slit, and the locking means for the collar piece consists here of a clip 90 which is made in the form of a bent metal wire. The clip 90 has two branches 92 which are substantially parallel to each other as shown in FIG. 7, and which are arranged to pass through the body of the collar piece from outside, so as to engage in the annular groove 20 of the tube member 10. The two branches 92 of the clip are arranged to pass through two chordal passages 94 which are formed within the thickness of the body of the collar piece, in such a way as to engage in two diametrically opposed regions of the groove 20.

The two branches 92 are joined together through a generally curved yoke portion 96, via two segments 98 which are parallel to each other. The two segments 98 are arranged to nest within two grooves 100, which are parallel to each other and to the axis of the collar piece 26. These grooves 100 are formed in the cylindrical posterior outer wall 32 of the body of the collar piece. The collar piece 26 must then be first fitted around the tube member 10, after which the clip 90 is introduced laterally until its two branches 92 lock the components together. When the clip is fully home as shown in FIG. 8, the collar piece is immobilised with respect to the tube member, and the yoke portion 96 of the clip is in engagement behind a posterior face 102 of the collar piece 26, see FIG. 7. Thus, when the collar piece is fully immobilised, the yoke portion 96 and the two segments 98 do not extend beyond the outer periphery of the collar piece.

The end portion of the tube member and the collar piece body are subsequently both introduced into the socket in the connector 12 in the manner described above with respect to the first embodiment. It should be noted that when the connector 12 is fitted around the end portion of the tube member and the collar piece, it is impossible to remove the clip 90.

In either one of the embodiments described above, it is possible to disconnect the connecting device by first of all releasing the locking ring 74 of the connector, in such a way as to enable the connector to be separated from the tube member, after which the collar piece is removed if necessary.

The invention may be used more particularly for making connections to motor vehicle heat exchangers.

What is claimed is:

1. A device for rapidly connecting together a tube member and a terminal pipe connector, comprising the tube member having an annular groove and a terminal end portion extending beyond the annular groove, a collar piece adapted to be introduced axially around the tube member, the collar piece having a first locking means for engaging in the annular groove of the tube member to immobilize the collar piece with respect to the tube member, and the pipe connector having a socket for receiving the end portion of the tube member together with the collar piece fitted to the latter, sealing means disposed between the connector and the tube member, and a second locking means for immobilizing the connector with respect to the collar piece, wherein the collar piece has a continuous annular body, said first locking means having a clip adapted to pass through the body of the collar piece from outside, to engage in the annular groove of the tube member.

2. A device according to claim 1, wherein said clip comprises two substantially parallel branches, the body of the collar piece having two passages such that said branches can pass respectively through said two passage to engage in two diametrically opposed regions of the groove of the tube member, the clip further including a yoke portion, its two said branches being joined together through said yoke portion, the yoke portion being configured to fit within the outer periphery of the collar piece.

3. A device for rapidly connecting together a tube member and a terminal pipe connector, comprising the tube member having an annular groove and a terminal end portion extending beyond the annular groove, a collar piece adapted to be introduced axially around the tube member, the collar piece having a first locking means for engaging in the annular groove of the tube member to immobilize the collar piece with respect to the tube member, and the pipe connector having a socket for receiving the end portion of the tube member together with the collar piece fitted to the latter, sealing means disposed between the connector and the tube member, and a second locking means for immobilizing the connector with respect to the collar piece, wherein said second locking means has a deformable ring at least partly surrounding the connector, said deformable ring having two opposed portions thereof, biased elastically towards each other, said connector having two opposed chordal passages, the collar piece having an annular peripheral groove, and said opposed portions of the deformable ring being arranged to pass through respective ones of said opposed chordal passages of the connector to engage in said annular groove of the collar piece.

4. A device according to claim 3, wherein the deformable ring is made from metal wire and includes an actuating finger.

* * * * *